(No Model.)
C. H. HERRICK.
FLEXIBLE CONDUIT FOR ELECTRIC CONDUCTORS.
No. 456,271. Patented July 21, 1891.
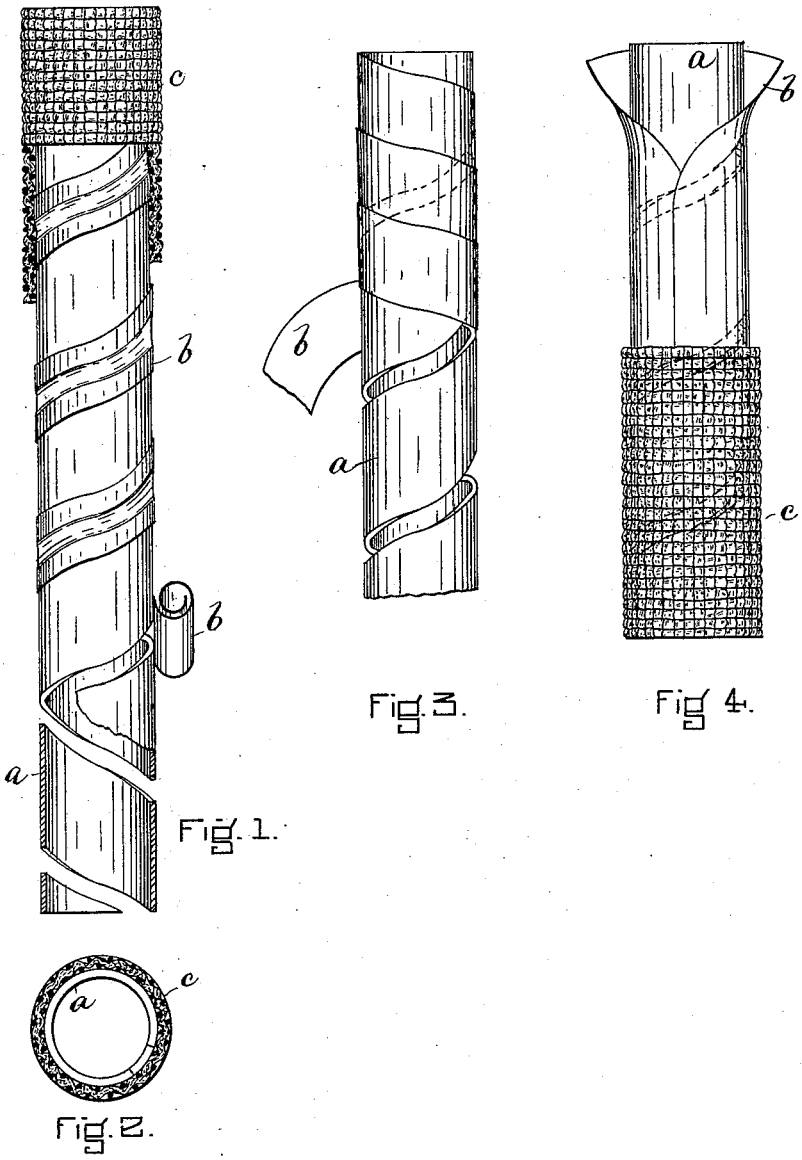

UNITED STATES PATENT OFFICE.

CHARLES H. HERRICK, OF WINCHESTER, ASSIGNOR OF TWO-THIRDS TO HERBERT H. BROOKS, OF CAMBRIDGE, AND ALFRED A. BROOKS, OF BOSTON, MASSACHUSETTS.

FLEXIBLE CONDUIT FOR ELECTRIC CONDUCTORS.

SPECIFICATION forming part of Letters Patent No. 456,271, dated July 21, 1891.

Application filed April 17, 1891. Serial No. 389,360. (No model.)

*To all whom it may concern:*

Be it known that I, CHARLES H. HERRICK, of Winchester, county of Middlesex, State of Massachusetts, have invented certain new and useful Improvements in Flexible Conduits for Electrical Conductors, of which the following is a specification.

The object of my invention is to provide an efficient and serviceable conduit for electrical conductors which shall protect and insulate the conductor or conductors introduced therein and which shall be flexible to such an extent that it shall be capable of being bent without injury to the desired angle or curve where it becomes necessary that a change should occur in the direction followed by the conductor, whereby the cutting and joining of the conduit required in the case of the conduits generally in use shall be obviated.

I have illustrated my invention in the accompanying drawings, wherein—

Figure 1 is a view showing a portion of a conduit embodying the invention, with the outer woven covering represented as extending only a short distance from the upper end of the said portion, while the protecting strip or tape is represented as extending somewhat farther, and the lower end of the spiral forming the lining of the conduit is represented as in longitudinal section. Fig. 2 is a view of the conduit in transverse section. Fig. 3 is a view showing the lining of the conduit with a protecting-strip wound thereon reversely to the direction of the spiral of the lining. Fig. 4 is a view showing a protecting-strip extending longitudinally of the lining and folded around the same in such manner that its edges overlap.

The conduit is composed of three parts— namely, an inner part or lining *a*, formed as a spiral, with the turns thereof preferably slightly separated, a protective wrapping constituted by a tape or strip *b* applied to the exterior of the lining in a manner to cover the narrow space left between the turns of the spiral, and an inclosing envelope *c*. The lining *a* may be of any suitable material formed into a strip and wound into the desired spiral. Metal may be used; but preferably some electrical non-conducting material will be used. Thus I may use hard rubber or ebonite. Preferably, however, I employ paper material, either in the form of paper-board or in that of chemically-prepared fiber. By forming the lining as a spiral the requisite flexibility is secured, and this flexibility is increased by slightly separating the turns of the spiral. The protecting-strip *b* is composed of some water-proof flexible material—such as oiled paper or rubber-coated cloth—which will be impervious to the waterproofing and insulating liquid compound that is applied to the exterior or covering *c* when the latter is composed of threads woven or braided around the other portion of the conduit, and which will prevent such compound or any moisture whatever from passing to the interior of the conduit at the line of separation between the turns of the spiral lining. The said strip or tape *b* may be variously applied to the lining, so as to cover the same at the said line of separation. For instance, it may be wrapped around the lining in a spiral corresponding with that of the lining, as in Fig. 1. It may be applied by winding it around the lining in a spiral which is the reverse in direction of that of the lining, as in Fig. 3, or it may be applied to the lining in a manner to extend longitudinally thereof and be folded or wrapped around the same so that its edges overlap each other, as in Fig. 4. The envelope or covering *c* (herein shown as a seamless tube of threads interwoven) is applied around the lining *a* outside the protecting-strip, and preferably is non-extensible itself, in order that strain on the conduit in the direction of its length may not operate to separate farther the turns of the spiral lining. To this end the said covering preferably is formed by weaving threads together around the lining and protective wrapping in the form of a tube. A braided tubular covering having threads introduced therein in a manner to destroy its extensibility would be the equivalent of the woven covering. When the protective strip is arranged as in Fig. 4—that is, extending longitudinally of the spiral lining and folded around the same, with its edges overlapping— the said protective strip itself will render the conduit non-extensible, and in this case an ordinary braided covering—that is, one without longitudinal threads—may be employed, if desired. To the woven or braided covering c will be applied in practice some known liquid waterproofing and insulating compound. The covering c may be formed as an envelope of some suitable plastic water-proof and insulating material—as, for instance, rubber.

The conduit constructed in the manner described and shown possesses all necessary flexibility for the purpose stated hereinbefore and will exclude all moisture, which would impair the insulation of the electrical conductor contained therein.

What I claim is—

1. A flexible conduit for electrical conductors, composed of a spiral lining, a protective wrapping applied to cover the line of separation between the turns of the spiral of the lining, and an inclosing envelope, substantially as described.

2. A flexible conduit for electrical conductors, composed of a spiral lining, a protective wrapping applied to cover the line of separation between the turns of the spiral of the lining, and a non-extensible woven or braided covering, substantially as described.

In testimony that I claim the foregoing as my invention I have hereunto subscribed my name in the presence of the following witnesses.

CHAS. H. HERRICK.

Witnesses:
H. H. BROOKS,
CHAS. F. RANDALL.